UdS011065684B2

United States Patent
Nishida et al.

(10) Patent No.: US 11,065,684 B2
(45) Date of Patent: Jul. 20, 2021

(54) MAGNESIUM OXIDE POWDER, PRODUCTION METHOD THEREFOR, THERMALLY-CONDUCTIVE RESIN COMPOSITION, THERMALLY-CONDUCTIVE GREASE, AND THERMALLY-CONDUCTIVE COATING MATERIAL

(71) Applicant: Ube Materials Industries, Ltd., Ube (JP)

(72) Inventors: Naoto Nishida, Ube (JP); Koji Nakamura, Ube (JP); Takashi Arase, Ube (JP)

(73) Assignee: UBE MATERIAL INDUSTRIES, LTD., Ube (JP)

(*) Notice: Subject to any disclaimer, the term of this patent is extended or adjusted under 35 U.S.C. 154(b) by 0 days.

(21) Appl. No.: 16/633,030

(22) PCT Filed: Nov. 5, 2018

(86) PCT No.: PCT/JP2018/041045
§ 371 (c)(1),
(2) Date: Jan. 22, 2020

(87) PCT Pub. No.: WO2019/107082
PCT Pub. Date: Jun. 6, 2019

(65) Prior Publication Data
US 2020/0246864 A1 Aug. 6, 2020

(30) Foreign Application Priority Data
Dec. 1, 2017 (JP) .............................. JP2017-231385

(51) Int. Cl.
B22F 1/00 (2006.01)
B22F 9/04 (2006.01)
C08K 3/22 (2006.01)

(52) U.S. Cl.
CPC .......... *B22F 1/0011* (2013.01); *B22F 1/0081* (2013.01); *B22F 9/04* (2013.01); *B22F 2302/25* (2013.01); *C08K 3/22* (2013.01); *C08K 2003/222* (2013.01)

(58) Field of Classification Search
CPC .. B22F 1/0011; B22F 1/0081; B22F 2302/25; B22F 9/04; C08K 2003/222
See application file for complete search history.

(56) References Cited

U.S. PATENT DOCUMENTS

| 4,721,691 | A | 1/1988 | Kawano |
| 5,039,509 | A | 8/1991 | Miyata et al. |
| 6,506,828 | B1 | 1/2003 | Anabuki et al. |
| 9,828,538 | B2 | 11/2017 | Nishida et al. |
| 2016/0222273 | A1* | 8/2016 | Nishida ................ C08K 3/36 |
| 2017/0044417 | A1 | 2/2017 | Fujimoto et al. |

FOREIGN PATENT DOCUMENTS

| CN | 105579506 A | 5/2016 |
| DE | 600 15 300 T2 | 3/2006 |
| EP | 2 455 339 A1 | 5/2012 |
| JP | 60-42272 A | 3/1985 |
| JP | S6042272 * | 3/1985 |
| JP | 61-36119 A | 2/1986 |
| JP | H01-131021 A | 5/1989 |
| JP | 2-212314 A | 8/1990 |
| JP | 2731854 B2 | 3/1998 |
| JP | 10-297956 A | 11/1998 |
| JP | 11-226702 A | 8/1999 |
| JP | 2004-238668 A | 8/2004 |
| JP | 2008-137845 A | 6/2008 |
| JP | 2015-59050 A | 3/2015 |
| JP | 2015-160781 A | 9/2015 |
| JP | 2016-88838 A | 5/2016 |
| WO | 2015/122427 A1 | 8/2015 |

OTHER PUBLICATIONS

International Search Report dated Dec. 25, 2018, issued in counterpart International Application No. PCT/JP2018/041045, with English Translation. (4 pages).
Decision to Grant a Patent dated Mar. 26, 2019, issued in counterpart of Japanese Patent Application No. 2017-231385 with English Translation (5 pages).
Notification of Reasons for Refusal dated Dec. 25, 2018, issued in counterpart of Japanese Patent Application No. 2017-231385, with English Translation (10 pages).
Office Action dated Apr. 14, 2020, issued in counterpart KR Application No. 10-2020-7002064, with English Translation. (7 pages).

* cited by examiner

*Primary Examiner* — Nicholas A Wang
(74) *Attorney, Agent, or Firm* — Westerman, Hattori, Daniels & Adrian, LLP

(57) ABSTRACT

A magnesium oxide powder has: a median diameter ($D_{50}$) of 5 to 100 μm; a MgO purity of 98% by mass or more; a Ca compound content of 2% by mass or less in terms of CaO; and when the magnesium oxide powder is immersed in pure water and allowed to stand at 95° C. for 24 hours, a mass ratio of calcium ions to magnesium ions, Ca/Mg, in an aqueous solution of 10 or less.

6 Claims, No Drawings

MAGNESIUM OXIDE POWDER, PRODUCTION METHOD THEREFOR, THERMALLY-CONDUCTIVE RESIN COMPOSITION, THERMALLY-CONDUCTIVE GREASE, AND THERMALLY-CONDUCTIVE COATING MATERIAL

TECHNICAL FIELD

The present invention relates to a magnesium oxide powder, a production method therefor, a thermally-conductive resin composition, a thermally-conductive grease, and a thermally-conductive coating material.

BACKGROUND ART

Conventionally, in order to promote heat dissipation of a heating position of electronic equipment and extend a life of a semiconductor and the like, a thermally-conductive component is used. The thermally-conductive component is produced by improving thermal conductivity by filling a silicone resin, an epoxy resin, a nylon resin, and the like with a thermally-conductive filler. As a material used for the thermally-conductive filler, magnesium oxide having excellent thermal conductivity has been studied, developed, and marketed. However, magnesium oxide has a problem in that it reacts with acid in addition to reacting with water to change into magnesium hydroxide. Therefore, magnesium oxide which has improved water resistance by adjusting chemical components and magnesium oxide which is subjected to surface treatment so that water repellency is imparted and a reaction with water or acid is suppressed, has been developed.

For example, Patent Literature 1 discloses magnesium oxide having excellent water resistance by controlling a $CaO/SiO_2$ ratio included in magnesium oxide. Further, Patent Literature 2 discloses surface-treated magnesium oxide having improved water resistance and acid resistance by treating a surface of magnesium oxide with a fatty acid or a silane coupling agent.

CITATION LIST

Patent Literature

Patent Literature 1: JP 2015-059050 A
Patent Literature 2: JP 2015-160781 A

SUMMARY OF INVENTION

Technical Problem

However, in the method of adjusting the chemical components, there is a subject in that it is desired to further improve water resistance, and in the method of producing a coating layer on the surface of the magnesium oxide particles, there is a problem in that the water resistance is insufficient due to a portion which is insufficiently surface-treated or thermal conductivity which is essential depending on a coating layer thickness and the like is lowered.

Accordingly, an object of the present invention is to provide a magnesium oxide powder having improved water resistance and acid resistance, a production method therefor, a thermally-conductive resin composition, a thermally-conductive grease, and a thermally-conductive coating material, without adding a treatment of magnesium oxide with other materials.

Solution to Problem

The present inventors conducted intensive studies in order to achieve the above object, and as a result, found that a particle surface of a magnesium oxide powder is polished and impurities such as calcium compounds which are unevenly distributed on the particle surface are removed, thereby improving water resistance and acid resistance of magnesium oxide itself, without adding a treatment of magnesium oxide with other materials, and completed the present invention.

That is, the present invention relates to a magnesium oxide powder having: a median diameter ($D_{50}$) of 5 to 100 μm; a MgO purity of 98% by mass or more; a Ca compound content of 2% by mass or less in terms of CaO; and when the magnesium oxide powder is immersed in pure water and allowed to stand at 95° C. for 24 hours, a mass ratio of calcium ions to magnesium ions, Ca/Mg, in an aqueous solution of 10 or less.

Further, the present invention relates to a production method for the magnesium oxide powder, the method including: a pulverization step of pulverizing a magnesia clinker to obtain a magnesium oxide powder; a polishing step of polishing the pulverized magnesium oxide powder to exfoliate a particle surface; and a classification step of classifying the polished magnesium oxide powder to remove the exfoliated fine powder.

Further, the present invention relates to a thermally-conductive resin composition, a thermally-conductive grease, and a thermally-conductive coating material, including the magnesium oxide powder filled in a resin.

Advantageous Effects of Invention

According to the present invention, a magnesium oxide powder having improved water resistance and acid resistance, a production method therefor, a thermally-conductive resin composition, a thermally-conductive grease, and a thermally-conductive coating material, can be provided, without adding a treatment of magnesium oxide with other materials.

DESCRIPTION OF EMBODIMENTS

1. Magnesium Oxide Powder

The magnesium oxide powder according to the present invention has a median diameter ($D_{50}$) in a range of 5 to 100 μm, preferably in a range of 10 to 80 μm, and more preferably in a range of 20 to 60 μm. When $D_{50}$ is less than 5 μm, handleability tends to be deteriorated due to increased viscosity at the time of filling in a resin. Meanwhile, when $D_{50}$ is more than 100 μm, a particle diameter is too large, and appearance may be impaired at the time of filling in a resin.

A purity of MgO in the magnesium oxide powder according to the present invention is 98% by mass or more, and preferably 98 to 99.9% by mass. Further, a content of a Ca compound in the magnesium oxide powder is 2% by mass or less, preferably 0.1 to 2% by mass, in terms of CaO.

In addition, when the purity of MgO in the magnesium oxide powder is 98% by mass or more, other elements and compounds in addition to Ca may be included, for example, Si, Al, Fe, B, and the like may be included. The contents are usually expressed in terms of an oxide.

A particle shape of the magnesium oxide powder is not particularly limited, but preferably has a circularity of 0.75 or more. The magnesium oxide powder having such a shape has improved flowability when filled in a resin and is easy to be highly filled in the resin, and thus, high thermal conductivity is easily obtained.

Further, a BET specific surface area of the magnesium oxide powder is preferably 0.01 to 1 $m^2/g$, and more preferably 0.1 to 0.5 $m^2/g$. When the BET specific surface area is in this range, the magnesium oxide powder can be easily highly filled in the resin, and thus, high thermal conductivity is easily obtained.

Further, the magnesium oxide powder according to the present invention has a mass ratio of calcium ions to magnesium ions, Ca/Mg, eluted in an aqueous solution of 10 or less, when immersed in pure water and allowed to stand at 95° C. for 24 hours. In addition, in the present specification, "when immersed in pure water and allowed to stand at 95° C. for 24 hours" is defined as a case in which measurement is performed in the same manner as in the method described in the Examples described later. When the magnesium oxide and the Ca compound included in the magnesium oxide powder of the present invention are compared, the Ca compound is easily dissolved in water and magnesium oxide tends to be dissolved in water with difficulty, and thus, as the mass ratio of calcium ions to magnesium ions, Ca/Mg, present in the aqueous solution is smaller, the amount of Ca compound present on the surface of the magnesium oxide powder is less. The mass ratio of calcium ions to magnesium ions, Ca/Mg, is 10 or less, preferably 6 or less, and more preferably 1 to 6.

Further, the magnesium oxide powder according to the present invention has, after being kept at a temperature of 85° C. and a humidity of 85% for 48 hours, a mass increase rate represented by the following Equation (1) of preferably 2% or less. In the present description, "being kept at a temperature of 85° C. and a humidity of 85% for 48 hours" is defined as being kept in the same manner as in the method described in the Examples described later. When the mass increase rate is within this range, water resistance can be sufficient.

Mass increase rate=((mass of magnesium oxide powder after being kept−mass of magnesium oxide powder before being kept)/mass of magnesium oxide powder before being kept)×100(%)  Equation (1)

Furthermore, it is preferred that when the magnesium oxide powder according to the present invention is dispersed in an aqueous sulfuric acid solution controlled to pH=3, it takes 1800 seconds or more until sulfuric acid equivalent to 50% of magnesium oxide powder is consumed. Within the range of the consumption time of sulfuric acid, the magnesium oxide powder can have excellent acid resistance. In addition, in the present description, a specific method of evaluating acid resistance is defined as a method similar to the method described in the Examples described later.

2. Production Method for Magnesium Oxide Powder

The magnesium oxide powder of the present invention can be produced by a pulverization step of pulverizing a magnesia clinker (dead burned magnesia) as a raw material, followed by a polishing step and a classification step. Hereinafter, the production method of the present invention will be described.

(0) Raw Material Preparation

The magnesia clinker, which is a raw material can be produced by a method of baking and thermally decomposing a magnesium salt such as magnesium hydroxide, magnesium carbonate, magnesium chloride, magnesium nitrate, or magnesium sulfate. As magnesium hydroxide, a precipitate generated by a reaction of a magnesium salt in seawater with calcium hydroxide can be used. Further, as magnesium carbonate, a magnesite ore or the like can be used. There is no particular limitation on baking conditions of magnesium hydroxide and magnesium carbonate, and generally the baking temperature is within a range of 1300° C. or higher, preferably 1300 to 2800° C., and more preferably 1400 to 2400° C., and the baking time is within a range of 10 minutes to 10 hours.

A purity of the magnesia clinker is preferably 98% by mass or more, more preferably 99% by mass or more, and particularly preferably 99.5% by mass or more. Examples of impurities contained in the magnesium oxide raw material include calcium compounds, silicon compounds, aluminum compounds, iron compounds, boron compounds, and the like. These impurities are present as a grain boundary phase in a boundary between crystal particles of MgO, in addition to those dissolved in a MgO crystal as a solid solution. Therefore, when the magnesia clinker is pulverized, non-uniform particles having a grain boundary phase attached to a part of the particles may be produced. Further, when pulverized powder of the magnesia clinker is brought into contact with water or acids, it is considered that the attached grain boundary phase becomes a starting point of the reaction and water resistance and acid resistance are decreased. Therefore, in the present invention, the surface of magnesium oxide powder obtained by pulverizing the magnesia clinker is polished to remove impurities present as the grain boundary phase, thereby improving water resistance and acid resistance. In addition, when the purity of magnesia clinker is less than 98% by mass, a proportion occupied by the grain boundary phase in the magnesia clinker is increased, and it becomes difficult to remove the grain boundary phase by surface polishing.

A crystal diameter of magnesium oxide constituting the magnesia clinker is preferably 5 to 200 μm, more preferably 15 to 150 μm, and particularly preferably 30 to 100 μm. When the crystal diameter is too small, the proportion of the grain boundary phase exposed to the particle surface at the time of being pulverized into magnesium oxide powder is decreased, it is difficult to sufficiently remove the grain boundary phase by polishing, and the specific surface area becomes large, so that filling properties in a resin, water resistance, and acid resistance may be adversely affected. Further, when the crystal diameter is too large, a grain boundary phase portion is ubiquitous at the time of being pulverized into magnesium oxide powder, and thus, a proportion of a portion other than the grain boundary phase which is removed by polishing is increased, which is inefficient.

(1) Pulverization Step

The pulverization step is a step of pulverizing a magnesia clinker to obtain magnesium oxide powder. Pulverization can be appropriately selected according to the properties of the magnesia clinker, which is a material to be pulverized, and the properties required for the obtained magnesium oxide powder. For example, the magnesium oxide powder can be obtained by using a crushing device such as a roll crusher or a jaw crusher, or a pulverization device such as a rolling ball mill or a vibration ball mill, alone or in combination of two or more. $D_{50}$ of the magnesium oxide powder obtained in the pulverization step can be appropriately selected as a size appropriate for the device used in the subsequent polishing step, but is preferably 5 μm to 300 mm.

(2) Polishing Step

The pulverization step is a step of polishing the magnesium oxide powder obtained in the pulverization step to exfoliate a grain boundary phase on the particle surface. Examples of a polishing method include a method using a contact between particles of magnesium oxide powder obtained in the pulverization step, a method using a contact between the magnesium oxide powder obtained in the pulverization step and a grindstone, and the like.

For the method using a contact between particles of magnesium oxide powder, a treatment with an airflow type pulverizer is effective, and examples thereof include a counter type jet mill, a swirling type jet mill, and the like. In particular, the swirling type jet mill is useful, since not only a polishing effect but also a particle size adjustment effect by a pulverization effect and a classification effect can be expected. In the case of a treatment with an airflow type pulverizer, a pulverization pressure is preferably 0.6 to 0.7 MPa.

Further, for the method using a contact between the magnesium oxide powder and a grindstone, a treatment with a casting sand reconditioning apparatus in which the magnesium oxide powder is brought into contact with a circular grindstone rotating at a high speed is effective, and for example, a casting sand reconditioning apparatus manufactured by Kiyota Casting Machine Co., Ltd. (product name: Sand Fresher) and the like can be used. In the case of the treatment with a casting sand reconditioning apparatus, a rotational circumferential speed of the circular grindstone is preferably 30 to 50 m/s and a polishing residence time is preferably 5 minutes to 1 hour.

(3) Classification Step

The classification step is a step of classifying the magnesium oxide powder obtained in the polishing step to remove fine powder of the exfoliated impurity components and also to obtain a preferable particle size distribution. A classification method is not particularly limited, and a vibrating sieve, an air separator, a cyclone type classifier, and the like can be used alone or in combination of two or more.

3. Thermally-Conductive Resin Composition, Thermally-Conductive Grease, and Thermally-Conductive Coating Material The magnesium oxide powder of the present invention can be filled in a resin as a thermally-conductive filler in the thermally-conductive resin composition to increase the thermal conductivity of a resin composition.

The kind of the resin blended in the thermally-conductive resin composition can be appropriately set according to the use and the like, but for example, may be a thermoplastic resin such as an olefin resin or a polyamide resin, or a thermosetting resin such as a silicone resin or an epoxy resin. The blending amount of each component is preferably 1 to 90% by mass of the magnesium oxide powder and 10 to 99% by mass of the resin when the total mass of the thermally-conductive resin composition is 100% by mass. When the blending amount of the magnesium oxide powder is less than 1% by mass, the thermal conductivity of the obtained resin composition is likely to be low. Further, the blending amount of the magnesium oxide powder is more than 90% by mass, a proportion of the magnesium oxide powder is increased, so that resin properties are likely to be adversely affected, in addition to an increase in a production cost.

The thermally-conductive resin composition can be produced by mixing a resin and the magnesium oxide powder by a known method. Further, the obtained thermally-conductive resin composition can be molded by a known method such as extrusion molding to be processed into a desired shape.

Further, the magnesium oxide powder may be used after a surface treatment for the purpose of improving dispersibility and mixing properties when the resin and the magnesium oxide powder are mixed, the mechanical properties of the obtained resin composition, and the like. As a compound which can be used in the surface treatment, a silane coupling agent having a vinyl group, a phenyl group, an amino group, or the like, a metal soap such as magnesium stearate, a surfactant such as sodium stearate, and the like can be used. The surface treatment may be performed by mixing these surface treatment agents with the magnesium oxide powder in advance by a mixer or the like, or may be performed by integral blend which is mixing at the time of kneading with the resin.

The thermally-conductive resin composition can be applied to various articles, and in particular, can be appropriately used for the article requiring high thermal conductivity and moisture resistance. Examples of such an article include a lamp socket and various electric components, and the like in the automobile field. Further, examples of such an article include a heat sink, a die pad, a printing wiring board, a semiconductor package component, a cooling fan component, a pickup component, a connector, a switch, a bearing, a case housing, and the like, in the electronic equipment field.

Further, since the magnesium oxide of the present invention has high water resistance and high acid resistance, it can be preferably used as a thermally-conductive filler for a thermally-conductive grease and a thermally-conductive coating material which transfer heat generated in an electronic component to a cooling component by filling or application between a heating unit of the electronic component and the cooling component.

EXAMPLES

Hereinafter, the present invention will be described in detail, based on the Examples, which, however, does not limit the objects of the present invention, and further, the present invention is not limited to these Examples.

First, an evaluation method used in the present Example is shown.

[Measurement of MgO Purity]

A MgO purity is determined by quantifying the contents of $CaO$, $SiO_2$, $Fe_2O_3$, $Al_2O_3$, and $B_2O_3$, and then subtracting the contents of five components from the whole by a subtracting method, in accordance with JIS R2212-4.

[Median Diameter ($D_{50}$)]

The median diameter ($D_{50}$) was measured using a particle size distribution measuring device manufactured by MicrotracBEL Corp., MT3300EX type.

[BET Specific Surface Area]

The BET specific surface area was measured by a BET single-point method, after degassing at 180° C. for 10 minutes as a pretreatment, using MONOSORB manufactured by YUASA Ionics Co., Ltd.

[Circularity]

The circularity was measured by dispersing magnesium oxide powder in a 0.2% aqueous sodium hexametaphosphate solution, using particle shape evaluation equipment manufactured by SEISHIN ENTERPRISE Co., Ltd., PITA-3.

[Water Resistance (Hygroscopicity)]

20 g of magnesium oxide powder was placed in a glass weighing bottle and weighed, and was kept in a thermohygrostat at a temperature of 85° C. and a humidity of 85% for 48 hours. Thereafter, the magnesium oxide powder was taken out of the thermohygrostat, the mass of the magnesium oxide powder was weighed, and a weight increase rate was determined by the following equation:

Mass increase rate=((mass of magnesium oxide powder after being kept (g)−mass of magnesium oxide powder before being kept (20 g))/mass of magnesium oxide powder before being kept (20 g))×100(%)

[Acid Resistance]

A magnesium oxide suspension obtained by dispersing magnesium oxide powder in ultrapure water was kept at pH=3 by adding 0.05 mol/L of sulfuric acid dropwise, using an automatic potential difference titration device (AT-510 type manufactured by KYOTO ELECTRONICS MANUFACTURING CO., LTD.), and the acid resistance was evaluated by the time required for a sulfuric acid consumption amount, which is a titer of sulfuric acid, to reach a 50% equivalent of the magnesium oxide powder.

First, measurement was performed for 100 mL of ultrapure water as a blank, and subsequently, the measurement was performed in the same manner for a suspension obtained by dispersing 50 mg of the magnesium oxide powder in 100 mL of ultrapure water. The sulfuric acid consumption amount of the blank was subtracted from the sulfuric acid consumption amount of the magnesium oxide suspension, and the amount of sulfuric acid consumed by the magnesium oxide powder was determined. The acid resistance was evaluated by the time when the consumption amount of sulfuric acid reached a 50% equivalent of magnesium oxide.

[Extraction Test Method of Eluted Ions]

40 g of magnesium oxide powder was weighed into a 500 mL of a polypropylene container, successively 400 mL of pure water was poured, the container was sealed, and then the container was allowed to stand in a hot air circulation type drier which was kept at 95° C. in advance. After 1 hour, the bottle cap was loosened, the internal pressure was released, then the container was sealed again and allowed to stand the hot air circulation type drier at 95° C., and was further allowed to stand warm for 23 hours which is a total of 24 hours. After cooling to room temperature, the content was filtered, and the amount of ions contained in the filtrate was analyzed by ICP and ion chromatography.

[Flowability]

The flowability was evaluated by interposing 5 g of a mixture of a liquid epoxy resin (828EL manufactured by Mitsubishi Chemical Corporation) and 50% by volume of magnesium oxide powder between mirror-polished stainless steel plates, and measuring a stretch diameter when rolling with pressure to 10 MPa at 50° C. in a small heat press machine (manufactured by AS ONE Corporation, model No. AH-2003C, with a cooling function).

Example 1

After a magnesia clinker manufactured by Ube Material Industries, Ltd., UBE995S (MgO purity of 99.5%, average crystal diameter of 37 μm) was crushed to 1 mm or less with a roll crusher manufactured by MAKINO Corporation, MRCA-0 type, pulverization and polishing treatments were performed at a feed rate of 10 kg/h and a pulverization pressure of 0.65 MPa, in a swirling type jet mill manufactured by SEISHIN ENTERPRISE Co., Ltd., STJ-200 type, to obtain a magnesium oxide powder having a median diameter ($D_{50}$) of 37 μm with a distribution between 1 μm to 1 mm. The magnesium oxide powder was sieved with an opening of 45 μm, powder of 5 μm or less was removed with an air separator, and a coarse powder side was recovered to obtain the magnesium oxide powder according to Example 1.

Example 2

After a magnesia clinker manufactured by Ube Material Industries, Ltd., UBE995S (MgO purity of 99.5%, average crystal diameter of 37 μm) was crushed to 1 mm or less with a roll crusher manufactured by MAKINO Corporation, MRCA-0 type, pulverization was performed with a vibration mill manufactured by CHUO KAKOHIKI CO., LTD., CH-20 type to obtain a magnesium oxide powder having a median diameter ($D_{50}$) of 54 μm with a distribution between 1 μm to 1 mm. The magnesium oxide powder was polished for 10 minutes at a rotational circumferential speed of 40 m/s of a circular grindstone using a casting sand reconditioning apparatus manufactured by Kiyota Casting Machine Co., Ltd., Sand Fresher BR305 type. The magnesium oxide powder was sieved with an opening of 45 μm, powder of 5 μm or less was removed with an air separator, and a coarse powder side was recovered to obtain the magnesium oxide powder according to Example 2.

Example 3

The magnesium oxide powder according to Example 3 was obtained in the same manner as in Example 2, except that the polishing treatment time was 20 minutes.

Comparative Example 1

The magnesium oxide powder according to Comparative Example 1 was obtained in the same manner as in Example 2, except that the polishing treatment was not performed.

[Evaluation Results]

Table 1 shows the results of measuring the MgO purity.

TABLE 1

|  | Example 1 | Example 2 | Example 3 | Comparative Example 1 |
|---|---|---|---|---|
| MgO | 99.63 | 99.64 | 99.64 | 99.63 |
| CaO | 0.18 | 0.18 | 0.18 | 0.19 |
| $SiO_2$ | 0.09 | 0.09 | 0.09 | 0.10 |
| $Fe_2O_3$ | 0.05 | 0.05 | 0.05 | 0.04 |
| $Al_2O_3$ | 0.04 | 0.03 | 0.03 | 0.03 |
| $B_2O_3$ | 0.003 | 0.003 | 0.003 | 0.003 |

Table 2 shows the results of the median diameter ($D_{50}$), the BET specific surface area, and the circularity.

TABLE 2

|  | Example 1 | Example 2 | Example 3 | Comparative Example 1 |
|---|---|---|---|---|
| Median diameter (μm) | 30 | 29 | 30 | 27 |
| BET specific surface area (m$^2$/g) | 0.16 | 0.26 | 0.22 | 0.26 |
| Circularity | 0.77 | 0.76 | 0.76 | 0.73 |

It can be seen from Table 2 that the magnesium oxide powder having almost the same median diameter was obtained in all samples by the classification operation. It was confirmed that the specific surface area was decreased as polishing proceeded, and at the same time, it was confirmed from the circularity that corners were removed and the circularity was improved as polishing proceeded.

Table 3 shows the results of the hygroscopicity and the acid resistance.

TABLE 3

|  | Example 1 | Example 2 | Example 3 | Comparative Example 1 |
|---|---|---|---|---|
| Hygroscopicity (%) | 0.89 | 0.84 | 1.18 | 3.98 |
| Acid resistance (second) | 2260 | 2090 | 2070 | 1660 |

It was confirmed from Table 3 that in the Examples, the hygroscopicity was improved by 60% or more and the acid resistance was improved by about 40% by the polishing treatment, as compared with the Comparative Example. The median diameter and the specific surface area were almost the same, but the hygroscopicity and the acid resistance were improved, and thus, the effect of removing the grain boundary phase by surface polishing was able to be confirmed.

Table 4 shows the results of measuring magnesium ions and calcium ions in an aqueous solution and the Ca/Mg mass ratio.

TABLE 4

|  | Example 1 | Example 2 | Example 3 | Comparative Example 1 |
|---|---|---|---|---|
| Mg ion concentration (mg/L) | 2.3 | 1.6 | 2.2 | 1.3 |
| Ca ion concentration (mg/L) | 12 | 6.9 | 6.5 | 14 |
| Ca/Mg mass ratio | 5.2 | 4.3 | 3.0 | 10.8 |

The effect of removing the calcium compounds on a particle surface was confirmed from Table 4, since in the Examples in which the particle surface was exfoliated, the mass ratio of the calcium ions to the eluted magnesium ions, Ca/Mg, was 10 or less.

Table 5 shows the evaluation results of the flowability.

TABLE 5

|  | Example 1 | Example 2 | Example 3 | Comparative Example 1 |
|---|---|---|---|---|
| Flowability (mm) | 105 | 119 | 114 | 62 |

It was confirmed from Table 5 that in the Examples, the flowability was improved by 40% or more, as compared with the Comparative Example.

The invention claimed is:

1. A magnesium oxide powder having: a median diameter ($D_{50}$) of 5 to 100 µm; a MgO purity of 98% to 99.9% by mass; a Ca compound content of 0.1 to 2% by mass in terms of CaO; and when the magnesium oxide powder is immersed in pure water and allowed to stand at 95° C. for 24 hours, a mass ratio of calcium ions to magnesium ions, Ca/Mg, in an aqueous solution of 1 to 6,
wherein when the magnesium oxide powder is dispersed in an aqueous sulfuric acid solution controlled to pH=3, 1800 seconds or more is taken until sulfuric acid equivalent to 50% of the magnesium oxide powder is consumed.

2. The magnesium oxide powder according to claim 1, wherein after the magnesium oxide powder is kept at a temperature of 85° C. and a humidity of 85% for 48 hours, a mass increase rate represented by the following Equation (1) is 2% or less:

Mass increase rate=((mass of magnesium oxide powder after being kept−mass of magnesium oxide powder before being kept)/mass of magnesium oxide powder before being kept)×100(%)   Equation (1).

3. A production method for the magnesium oxide powder according to claim 1, the method comprising:
a pulverization step of pulverizing a magnesia clinker to obtain a magnesium oxide powder;
a polishing step of polishing the pulverized magnesium oxide powder to exfoliate a particle surface; and
a classification step of classifying the polished magnesium oxide powder to remove the exfoliated fine powder.

4. A thermally-conductive resin composition, comprising the magnesium oxide powder according to claim 1 filled in a resin.

5. A thermally-conductive grease, comprising the magnesium oxide powder according to claim 1 filled in a resin.

6. A thermally-conductive coating material, comprising the magnesium oxide powder according to claim 1 filled in a resin.

* * * * *